US011984013B2

(12) United States Patent
Kulkarni et al.

(10) Patent No.: US 11,984,013 B2
(45) **Date of Patent: *May 14, 2024**

(54) EVENT DETECTION USING DISTRIBUTED EVENT DEVICES

(71) Applicant: Honeywell International Inc., Charlotte, NC (US)

(72) Inventors: Sagar Ramesh Kulkarni, Bangalore (IN); Sudeep Jayakumar Duge, Bangalore (IN); Sameer Tripathi, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,383

(22) Filed: Feb. 1, 2023

(65) Prior Publication Data

US 2023/0169847 A1 Jun. 1, 2023

Related U.S. Application Data

(63) Continuation of application No. 17/527,354, filed on Nov. 16, 2021, now Pat. No. 11,587,429.

(51) Int. Cl.

| | |
|---|---|
| ***G08B 25/10*** | (2006.01) |
| ***G08B 25/00*** | (2006.01) |
| ***G08B 27/00*** | (2006.01) |

(52) U.S. Cl.

CPC ........... *G08B 25/10* (2013.01); *G08B 25/006* (2013.01); *G08B 27/00* (2013.01)

(58) Field of Classification Search

CPC ....... G08B 25/10; G08B 25/006; G08B 27/00

See application file for complete search history.

(56) References Cited

U.S. PATENT DOCUMENTS

| | | | | |
|---|---|---|---|---|
| 5,416,725 | A | 5/1995 | Pacheco et al. | |
| 6,545,602 | B2 | 4/2003 | Yamaguchi et al. | |
| 8,155,664 | B2 | 4/2012 | McFarland | |
| 8,200,273 | B2 | 6/2012 | McFarland | |
| 9,245,440 | B2 * | 1/2016 | Painter | G08B 27/006 |
| 9,652,960 | B2 | 5/2017 | Flinsenberg et al. | |
| 10,186,133 | B2 | 1/2019 | Jang | |

(Continued)

FOREIGN PATENT DOCUMENTS

JP 2011232994 A 11/2011

*Primary Examiner* — John A Tweel, Jr.

(74) *Attorney, Agent, or Firm* — Brooks, Cameron & Huebsch, PLLC

(57) ABSTRACT

Devices, systems, and methods for event detection using distributed event devices are described herein. In some examples, one or more embodiments include a first event device and a second event device, where the first event device is configured to detect an event in an area and wirelessly transmit a notification of the detected event and location information associated with the first event device to the second event device, and where the second event device is configured to receive the notification of the detected event and the location information from the first event device, determine whether the location information matches a location included in a database in response to receiving the detected event, and perform an activation action responsive to determining the location information matches a location included in the database.

20 Claims, 3 Drawing Sheets

(56) References Cited

U.S. PATENT DOCUMENTS

| | | | | |
|---|---|---|---|---|
| 11,043,111 | B1 * | 6/2021 | Escofet Via | G08B 29/16 |
| 11,057,366 | B2 | 7/2021 | Avetisov et al. | |
| 11,296,937 | B2 | 4/2022 | Nolan et al. | |
| 11,587,429 | B1 * | 2/2023 | Kulkarni | G08B 29/16 |
| 11,595,838 | B2 * | 2/2023 | Wolf | G08B 29/126 |
| 2005/0130670 | A1 | 6/2005 | Gould et al. | |
| 2011/0045841 | A1 | 2/2011 | Kuhlke et al. | |
| 2011/0068915 | A1 | 3/2011 | Wakefield, III | |
| 2021/0158685 | A1 | 5/2021 | Bernotas et al. | |

* cited by examiner

| | | |
|---|---|---|
| 204 | LOGICAL ZONE | ACTIVATION ACTION |
| 210-1 | ZONE 1 | ON |
| 210-2 | ZONE 2 | PULSE |
| 210-3 | ZONE 3 | DELAYED ON |
| 210-4 | ZONE 4 | DELAYED PULSE |
| 210-5 | ZONE 5 | OFF |

EVENT DETECTION USING DISTRIBUTED EVENT DEVICES

PRIORITY INFORMATION

This application is a continuation of U.S. application Ser. No. 17/527,354, filed Nov. 16, 2021, the contents of which are incorporated by reference.

TECHNICAL FIELD

The present disclosure relates to devices, systems, and methods for event detection using distributed event devices.

BACKGROUND

Large facilities (e.g., buildings), such as commercial facilities, office buildings, hospitals, and the like, may have an alarm system that can be triggered during an emergency situation (e.g., a fire) to warn occupants to evacuate. For example, an alarm system may include a control panel (e.g., a fire control panel) and a plurality of event devices (e.g., hazard sensing devices, input devices, output devices, etc.) located throughout the facility (e.g., on different floors and/or in different rooms of the facility) that can perform an action when a hazard event is occurring in the facility and provide a notification of the hazard event to the occupants of the facility via alarms or other mechanisms.

DETAILED DESCRIPTION

Figures 1, 2:
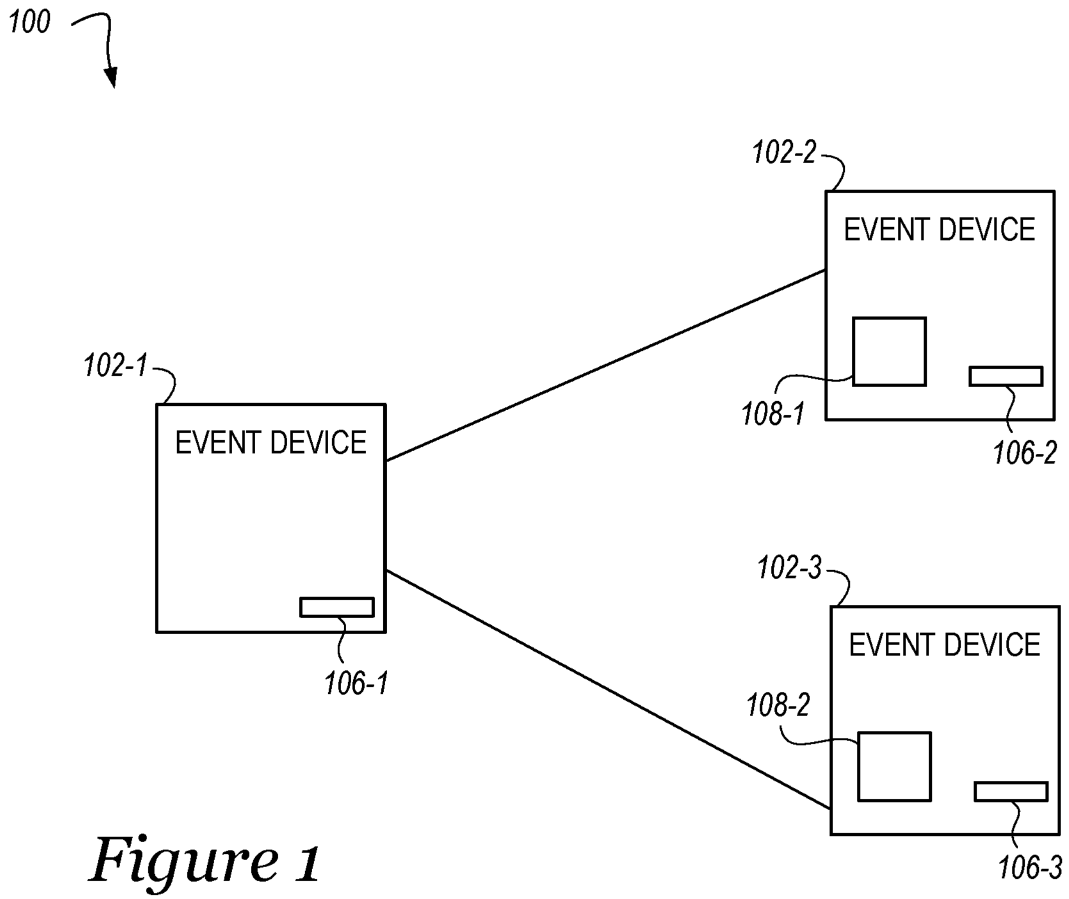
FIG. 1 is an example of a system for event detection using distributed event devices, in accordance with one or more embodiments of the present disclosure.
FIG. 2 is an example of a zonal action list, in accordance with one or more embodiments of the present disclosure.

Devices, systems, and methods for event detection using distributed event devices are described herein. In some examples, one or more embodiments include a first event device and a second event device, where the first event device is configured to detect an event in an area and wirelessly transmit a notification of the detected event and location information associated with the first event device to the second event device, and where the second event device is configured to receive the notification of the detected event and the location information from the first event device, determine whether the location information matches a location included in a database in response to receiving the detected event, and perform an activation action responsive to determining the location information matches a location included in the database.

A control panel may be connected to various event devices located throughout a facility to comprise an alarm system in the facility. The control panel can receive information from event devices, process the information, and transmit other information accordingly. For example, the control panel of a facility may receive information from an event device in the facility and determine, based on predetermined logical functions, whether an emergency event such as a fire event is occurring in the facility based on such received information. Further, in other examples, the control panel may provide for automatic control of equipment in response to detection of an event in the facility, as well as monitor operational integrity of such event devices, among other functions.

In previous approaches, a control panel can be located in an area with backup power systems and can be connected to event devices via wired connections. However, failure of the control panel may lead to failure of the entire alarm system for the facility. Additionally, the wired connections between the event devices and the control panel may be difficult to install, setup, and debug, resulting in high material costs (e.g., for wiring and other materials) as well as labor and installation costs. Further, modification of the alarm system may result in changes in such wiring schemes, and can be difficult and expensive to implement (e.g., as a result of material and/or labor costs).

Event detection using distributed event devices according to the present disclosure can allow for a decentralized alarm system in a facility. Event devices can be wirelessly connected with each other in a wireless mesh network, avoiding the need for expensive wire and time-consuming and/or laborious installation. Further, logical functions normally performed by the control panel can be performed by certain ones of the event devices, allowing for distribution (e.g., decentralization) of the logical functions across the system of event devices instead of within a control panel, preventing an entire alarm system failure in the event the control panel fails. Accordingly, event detection using distributed event devices can allow for a safer and easier to install alarm system as compared with previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of a system 100 for event detection using distributed event devices 102, in accordance with one or more embodiments of the present disclosure. The system

100 can include event devices 102-1, 102-2, 102-3 (referred to collectively herein as event devices 102).

As illustrated in FIG. 1, the event devices 102 can be included in a facility and can be connected to each other. As used herein, the term “event device” refers to a device that can receive an input relating to an event and/or generate an output relating to an event. Such an event can be, for instance, a hazard event such as a fire. For example, an event device 102-1, 102-2, 102-3 can receive an input relating to a fire occurring in the facility. Such event devices 102 can be a part of an alarm system of the facility and can include devices such as fire sensors, smoke detectors, heat detectors, carbon monoxide (CO) detectors, or combinations of these; interfaces; manual call points (MCPs), pull stations; input/output modules; aspirating units; and/or audio/visual devices (e.g., speakers, sounders, flashers, buzzers, microphones, cameras, video displays, video screens, etc.), relay output modules, among other types of event devices.

Event devices 102 can be located in different areas of a facility. For example, the event device 102-1 may be located on a first floor of the facility, the event device 102-2 may be located on a second floor of the facility, etc. Further, event devices 102 may cover logical zones of the facility. As used herein, the term “logical zone” refers to an electronically defined area that corresponds to a physical area. A logical zone can correspond to a particular area of a facility, a portion of an area of the facility, etc. For example, a first logical zone may correspond to the first floor of the facility and be covered by the first event device 102-1, a second logical zone may correspond to the second floor of the facility and be covered by the second event device 102-2, etc. However, examples of the disclosure are not so limited. For example, the first logical zone may correspond to a first portion of the first floor of the facility and be covered by the first event device 102-1, the second logical zone may correspond to a second portion of the first floor of the facility and be covered by the second event device 102-2, etc. In other words, a logical zone may cover an entire area of a facility, a portion of the area of the facility, etc. Further, certain event devices may share the same logical zone (e.g., logical zones may overlap each other). For example, the event device 102-1 and the event device 102-2 may be associated with the same, or portions of the same, logical zone.

The event device 102-1 can be associated with an area of the facility for monitoring for and detection of events. If an event such as a fire occurs in the area, the event device 102-1 can detect the event. For example, the event device 102-1 may be a smoke detector that detects the presence of smoke in the area associated with the event device 102-1. The event device 102-1 can wirelessly transmit a notification of the detected event and location information associated with the event device 102-1 to the event device 102-2 and to the event device 102-3. The notification can include information (e.g., data) indicating to the event device 102-2 and event device 102-3 that the event is detected by the event device 102-1.

As illustrated in FIG. 1, the event devices 102-1, 102-2, 102-3 can include charge storage devices 106-1, 106-2, 106-3, respectively. As used herein, the term “charge storage device” refers to a device which stores electrical energy. In some examples, a charge storage device may include a battery, a capacitor, etc. For example, the event device 102-1 can include a charge storage device 106-1 (e.g., a battery) and can be powered by the charge storage device 106-1. Additionally, event devices 102-2 and 102-3 similarly can include charge storage devices 106-2 and 106-3, respectively, and be powered by their respective charge storage devices 106-2, 106-3.

The location information associated with the event device 102-1 can include a logical zone associated with the event device 102-1 that defines an area covered by the event device 102-1, as mentioned above. For example, the location information can include logical zone 1, where logical zone 1 corresponds to a portion of a space (e.g., a first portion of a warehouse). Further, in some examples, the event device 102-2 may include the same logical zone as the event device 102-1 or a different logical zone from the event device 102-1. The event device 102-3 may include a same or different logical zone than event devices 102-1 and/or 102-2.

In the example mentioned above, the event device 102-1 may detect the presence of smoke in the first portion of the warehouse associated with the event device 102-1. When the event device 102-1 detects smoke in the first portion of the warehouse, the event device 102-1 wirelessly transmits the notification of the detected event (e.g., the detected smoke) and location information (e.g., the logical zone associated with the event device 102-1) to event devices 102-2 and 102-3. The event devices 102-1, 102-2, 102-3 can be connected via a wireless network relationship for such transmission, as is further described in connection with FIG. 3.

The event devices 102-2 and 102-3 can receive the notification of the detected event and the location information from the event device 102-1. The event device 102-2 can determine whether the detected event and the location information match an event and location information included in a database 108-1. As illustrated in FIG. 1, the event device 102-2 includes a database 108-1. The database 108-1 can be included in memory included in the event device 102-2, as is further described in connection with FIG. 4. Similarly, event device 102-3 includes a database 108-2 included in the memory of the event device 102-3.

The database 108-1 can include a zonal action list corresponding to the event device 102-2. The zonal action list can include a number of logical functions that include a logical zone and associated activation action, as is further described in connection with FIG. 2. The event device 102-2 can utilize the location information to determine, utilizing the zonal action list, an activation action, as is further described herein.

The event device 102-2 can determine whether the location information from the event device 102-1 matches a location included in the database 108-1 in response to receiving the detected event from event device 102-1. In order to determine whether to perform an activation action, the event device 102-2 determines whether the location information (e.g., the logical zone) is included in the zonal action list and performs an activation action or refrains from performing an activation action based on the comparison, as is further described in connection with FIG. 3. For example, the event device 102-2 can compare the location information (e.g., logical zone of event device 102-1 is Zone 1) with elements in the database 108-1; if the logical zone of the event device 102-1 (e.g., Zone 1) is included in the database 108-1, the event device 102-2 can perform an activation action corresponding to the logical zone (e.g., turn on a flasher, unlock a door via a relay output module, etc).

Similarly, the event device 102-3 can determine whether the location information from the event device 102-1 matches a location in the database 108-2 in response to receiving the detected event from event device 102-1. The event device 102-3 compares the location information (e.g., logical zone of the event device 102-1 is Zone 1) with elements in the database 108-2; if the logical zone of the event device 102-1 (e.g., Zone 1) is included in the database 108-2, the event device 102-3 can perform an activation action corresponding to the logical zone (e.g., turn on a pulser).

Accordingly, as described above, the system 100 distributes logical functions such as determination of whether to perform activation actions when an event is detected across a number of event devices 102. If a particular one of the event devices 102 fails, the other event devices 102 may still perform activation actions. Such an approach can decentralize the alarm system of a facility by distribution of the logical functions from a control panel to the event devices 102, allowing for a safer and more reliable alarm system, as compared with previous approaches. Further, powering the event devices 102 via charge storage devices 106 can prevent the need to power the event devices 102 via wires, allowing for an easier to install alarm system as compared with previous approaches.

FIG. 2 is an example of a zonal action list 204, in accordance with one or more embodiments of the present disclosure. The zonal action list 204 can include, for instance, elements 210-1, 210-2, 210-3, 210-4, 210-5 (referred to collectively herein as elements 210).

The zonal action list 204 illustrated in FIG. 2 can be a list included in a database of an event device. For example, the zonal action list 204 can be a list included in an event device 102-1, 102-2, 102-3, previously described in connection with FIG. 1.

The zonal action list 204 includes a number of elements 210. The elements 210 can be, for example, logical functions having an input (e.g., a logical zone) and an output (e.g., an activation action). For instance, element 210-1 can include logical "Zone 1" with an activation action of "ON". Accordingly, when an event device (e.g., a first event device) including the zonal action list 204 receives a notification of a detected event and location information from a different event device (e.g., a second event device), the first event device compares the location information to the zonal action list 204 to determine whether the zonal information is included in the zonal action list 204.

For example, the first event device can receive a notification of a detected event and location information from the second event device indicating the second event device's logical zone is "Zone 1". Accordingly, the first event device compares the location information (Zone 1) to the zonal action list 204. The first event device determines Zone 1 is in the zonal action list 204, as the location information (e.g., Zone 1) matches an element 210-1 in the zonal action list 204.

In response to the location information matching element 210-1, the first event device determines which activation action to perform. For example, the first event device determines that in response to receiving Zone 1 location information from a different event device, the first event device is to perform an activation action by turning "ON" the first event device. The first event device may be, for example, a sounder, buzzer, etc. Accordingly, the first event device may turn ON the sounder to emit an audible noise. The audible noise may warn occupants of a space of a detected event, as previously described in connection with FIG. 1.

Although the activation action is described above as being a sounder turned on, embodiments of the present disclosure are not so limited. For example, the first event device may receive a notification of a detected event and location information from a third event device, where the location information of the third event device is "Zone 4". Accordingly, the first event device compares the location information (Zone 4) to the zonal action list 204, determines Zone 4 is in the zonal action list 204 (e.g., as Zone 4 matches element 210-4), and determines that the first event device is to perform activation action of a "DELAYED PULSE". Based on the two examples above, the first event device can, accordingly, perform activation actions for second and third event devices. The first, second, and third event devices may be monitoring a common area in a facility and accordingly, can perform activation actions when events may be detected in areas within the common area of the facility.

However, embodiments of the present disclosure are not so limited. For example, the first event device may also be in communication with event devices monitoring a different area. For instance, the first event device may receive a notification of a detected event and location information from a fourth event device, where the location information of the fourth event device is "Zone 5". Accordingly, the first event device compares the location information (Zone 5) to the zonal action list 204, determines Zone 5 is in the zonal action list 204 (e.g., as Zone 5 matches element 210-5), and determines that the first event device is to perform activation action of "OFF". That is, the first event device is to remain off. In such an example, the first event device is in communication with the second, third, and fourth event devices. However, the first event device may not be in an area of the facility where the event was detected by the fourth event device. Accordingly, the first event device can remain off to avoid confusion if an event (e.g., an emergency event) is detected by the fourth event device. Rather, the fourth event device may also transmit a notification of the event and the location information to other event devices that may be in the area of the fourth event device. The other event devices may include zonal action lists that cause the other event devices to perform activation actions.

Although the activation actions described above include turning a sounder on, turning a sounder on a delayed pulse, and remaining off, embodiments of the present disclosure are not so limited. For example, other activation actions for a sounder can include turning on the sounder, pulsing the sounder, delaying turning on of the sounder, delaying pulsing of the sounder, refraining from turning on the sounder, refraining from pulsing the sounder, double knocking the sounder (e.g., turning on the sounder in response to a fire event being detected at least twice in the same zone, or turning on the sounder in response to a fire event being detected in two different zones), among other examples.

Further, although activation actions are described above using a sounder, embodiments of the present disclosure are not so limited. For example, the event device may be a flasher, and activation actions for the flasher can include turning on the flasher, pulsing the flasher, delaying turning on of the flasher, delaying pulsing of the flasher, refraining from turning on the flasher, and/or refraining from pulsing the flasher, double knocking the flasher (e.g., turning on the flasher in response to a fire event being detected at least twice in the same zone, or turning on the flasher in response to a fire event being detected in two different zones), among other examples. Additionally, event devices other than sounders and/or flashers may be utilized. For example, the event device can be a relay output module to act as a switch for a power source for door locks that can unlock a door as an activation action.

As described above, event devices can utilize zonal action lists to distribute logical functions for an alarm system in a facility across a number of event devices. Such an approach can allow for a decentralized alarm system in the facility.

Figure 3:
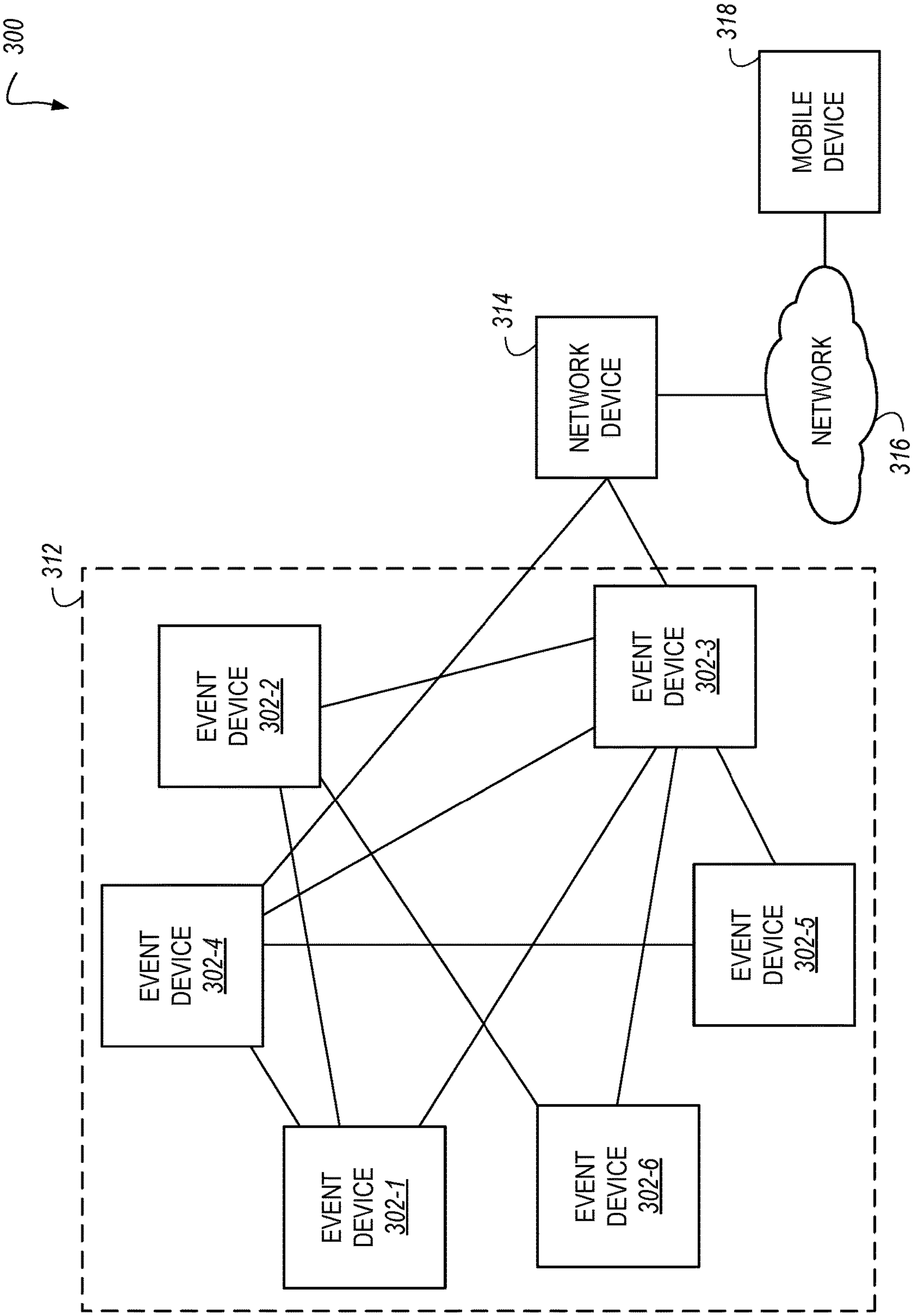
FIG. 3 is an example of a system for event detection using distributed event devices, in accordance with one or more embodiments of the present disclosure.

FIG. 3 is an example of a system 300 for event detection using distributed event devices, in accordance with one or more embodiments of the present disclosure. The system 300 can include event devices 302-1, 302-2, 302-3, 302-4, 302-5, 302-6 (referred to collectively herein as event devices 302), network device 314, network 316, and mobile device 318.

As illustrated in FIG. 3, the system 300 can include event devices 302. In some examples, event device 302-1 can be a fire sensor, event device 302-2 can be a sounder, event device 302-3 can be a flasher, event device 302-4 can be a flasher, event device 302-5 can be a heat sensor, and event device 302-6 can be a manual call point (MCP).

The event devices 302 can be in wireless communication with each other via a network relationship. In some examples, the network relationship can be a wireless mesh network 312. As used herein, the term "wireless mesh network" refers to a communication network made up of nodes organized in a mesh topology. The nodes making up the wireless mesh network 312 can be, for example, the event devices 302. That is, each of the event devices 302 include wireless transmitters and/or receivers in order to transmit and/or receive information between each other via the wireless mesh network 312. In some examples, the wireless mesh network is a radio frequency (RF) mesh network.

Although the network relationship described above includes a wireless mesh network, embodiments of the present disclosure are not so limited. For example, the network relationship can be any other wired or wireless network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As previously described in connection with FIG. 1, different ones of the event devices 302 may monitor different zones of a facility. For example, event device 302-1 can monitor Zone 1 (e.g., since event device 302-1 is a fire sensor) and event device 302-5 can monitor Zone 5 (e.g., since event device 302-5 is a heat sensor). Accordingly, event devices 302-1 and 302-5 may be sensor devices. Additionally, since event device 302-2 is a sounder, event device 302-3 is a flasher, and event device 302-4 is a flasher, event devices 302-2, 302-3, and 302-4 may be notification devices. Sensor event devices and notification event devices may work in conjunction with each other to detect and notify for events in a facility, as is further described herein.

As mentioned above, event device 302-1 can be a fire sensor monitoring Zone 1 of a facility. Zone 1 of the facility can be a logical zone that corresponds to a physical area of the facility. Accordingly, when an event occurs in the physical area corresponding to Zone 1, the event device 302-1 can detect the event. For example, a fire may occur in the physical area corresponding to Zone 1, and the event device 302-1 detects the fire event.

In response to detecting the fire event, the event device 302-1 wirelessly transmits a notification of the detected fire event and location information associated with the event device 302-1 to event devices that event device 302-1 is in wireless communication with. For example, the event device 302-1 wirelessly transmits the notification of the detected fire event and location information associated with the event device 302-1 to event devices 302-2, 302-3, and 302-4. The location information includes the logical zone defining the area monitored by the event device 302-1 (e.g., Zone 1).

Upon receipt of the notification and the location information from event device 302-1, event device 302-2 can determine whether the location information is included in a zonal action list stored locally at the event device 302-2. As previously described in connection with FIG. 2, the zonal action list of the event device 302-2 includes a number of elements that are logical functions having an input and an output. The zonal action list of event device 302-2 can include for instance, Zone 1: On, Zone 2: Pulse, Zone 3: Off, Zone 4: Delayed On, Zone 5: Delayed Pulse, Zone 6: Double Knock.

The event device 302-2 can determine whether Zone 1 is included in the zonal action list of event device 302-2 by trying to match the location information to an element of the number of elements. For example, the event device 302-2 determines that the location information of event device 302-1 (e.g., Zone 1) matches an element included in the zonal action list for event device 302-2 (e.g., Zone 1: On). Accordingly, the event device 302-2 performs an activation action in response to the location information matching an element in the zonal action list by turning on the sounder. Accordingly, the event device 302-2 turns on when the event device 302-1 detects an event.

Event device 302-3 also receives the notification and the location information from event device 302-1. Upon receipt of the notification and the location information from event device 302-1, event device 302-3 can determine whether the location information is included in a zonal action list stored locally at the event device 302-3. Similar to the event device 302-2, the zonal action list of the event device 302-3 includes a number of elements that are logical functions having an input and an output. The zonal action list of event device 302-3 can include for instance, Zone 1: Off, Zone 2: Pulse, Zone 3: On, Zone 4: On, Zone 5: Delayed On.

The event device 302-3 can determine whether Zone 1 is included in the zonal action list of event device 302-3 by trying to match the location information to an element of the number of elements. For example, the event device 302-3 determines that the location information of event device 302-1 (e.g., Zone 1) matches an element included in the zonal action list for event device 302-3 (e.g., Zone 1: Off). Accordingly, the event device 302-3 performs an activation action in response to the location information matching an element in the zonal action list by keeping the flasher turned off. Accordingly, the event device 302-3 remains off when the event device 302-1 detects an event. Event device 302-4 can perform a similar method.

As another example, event device 302-5 can be a heat sensor monitoring Zone 4 of a facility. Zone 4 of the facility can be a logical zone that corresponds to another physical area of the facility (e.g., different from Zone 1). Accordingly, when an event occurs in the physical area corresponding to Zone 4, the event device 302-5 can detect the event. For example, a fire may occur in the physical area corresponding to Zone 4, and the event device 302-5 detects heat from the fire event.

In response to detecting the fire event, the event device 302-5 wirelessly transmits a notification of the detected fire event and location information associated with the event device 302-5 to event devices that event device 302-5 is in wireless communication with. For example, the event device 302-5 wirelessly transmits the notification of the detected fire event and location information associated with the event device 302-5 to event devices 302-3 and 302-4. The location information includes the logical zone defining the area monitored by the event device 302-5 (e.g., Zone 4).

Upon receipt of the notification and the location information from event device 302-5, event device 302-4 can determine whether the location information is included in a zonal action list stored locally at the event device 302-4. The zonal action list of event device 302-4 can include for instance, Zone 1: On, Zone 2: Pulse, Zone 3: Off, Zone 4: Delayed On, Zone 5: Delayed Pulse. The event device 302-4 determines that the location information of event device 302-5 (e.g., Zone 4) matches an element included in the zonal action list for event device 302-4 (e.g., Zone 4: Delayed On). Accordingly, the event device 302-4 performs an activation action in response to the location information matching an element in the zonal action list by turning on the sounder after a predetermined time delay. Accordingly, the event device 302-4 turns on after a time delay when the event device 302-5 detects an event.

Additionally, upon receipt of the notification and the location information from event device 302-5, event device 302-3 can determine whether the location information is included in a zonal action list stored locally at the event device 302-3. The zonal action list of event device 302-3 can include for instance, Zone 1: Off, Zone 2: Pulse, Zone 3: On, Zone 4: On, Zone 5: Delayed On. The event device 302-3 determines that the location information of event device 302-5 (e.g., Zone 4) matches an element included in the zonal action list for event device 302-3 (e.g., Zone 4: On). Accordingly, the event device 302-3 performs an activation action in response to the location information matching an element in the zonal action list by turning on the sounder. Accordingly, the event device 302-3 turns on when the event device 302-5 detects an event. Event device 302-4 can perform a similar method.

As mentioned above, event device 302-6 can be a manual call point (MCP). As used herein, the term "MCP" refers to a device which enables a user to transmit information in an event scenario. An MCP can be, for example a wall-mounted switch. In some examples, a user may cause the switch to be activated, and the MCP can detect the input to the MCP.

The event device 302-6 can transmit the input to event device 302-2 and 302-3. In some examples, the event device 302-2 and/or 302-3 can receive the input from the event device 302-6 and cease the activation actions in response. For example, event device 302-2 may be turned on as a result of an activation action. The event device 302-6 can transmit the input to the event device 302-2 to cause the event device 302-2 to turn off (e.g., cease the activation action). Accordingly, in some examples, the event device 302-6 can act to silence other event devices 302.

However, embodiments of the present disclosure are not so limited. For example, in response to receiving the input, event device 302-6 can transmit the input to an event device (e.g., event device 302-3) to cause the event device 302-3 to perform an activation action according to the process described above (e.g., compare location information of event device 302-6 to a zonal action list, perform activation action accordingly).

As illustrated in FIG. 3, the event devices are wirelessly connected to each other via the wireless mesh network 312. The system 300 can further include a network device 314. As used herein, the term "network device" refers to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As illustrated in FIG. 3, the network device 314 can be in wireless communication with event devices 302-3 and 302-4 via the wireless mesh network 312. However, embodiments of the present disclosure are not so limited. For example, the network device 314 can be in wireless communication with any of the event devices 302 via the wireless mesh network 312.

The network device 314 is configured to receive the notification of the detected event from the event device 302-3 and/or 302-4. For example, in response to the event device 302-3 receiving the notification of the detected event from event device 302-1, the event device 302-3 transmits the notification to the network device 314.

The network device 314 can transmit the notification of the detected event to the mobile device 318 via the network 316. The network 316 can be, for example, a wired or wireless network relationship, previously described above. The mobile device 318 can receive the notification of the detected event, allowing a user of the mobile device 318 to be notified of the event detected by the event device 302-1.

Figure 4:
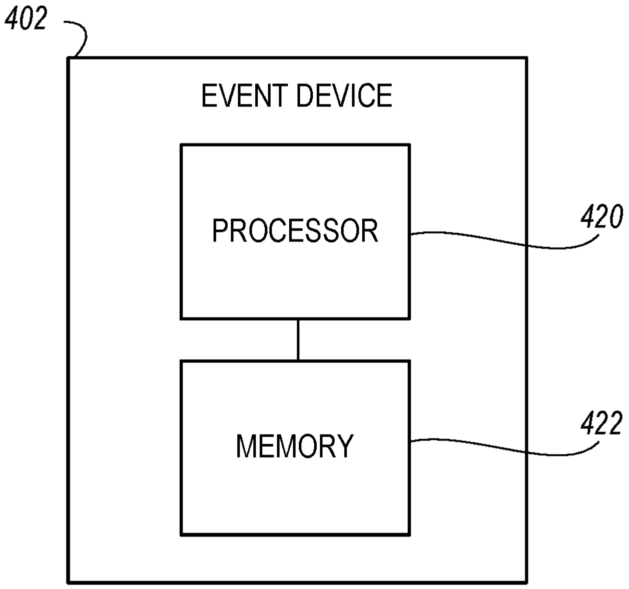
FIG. 4 is an example of an event device for event detection using distributed event devices, in accordance with one or more embodiments of the present disclosure.

FIG. 4 is an example of an event device 402 for event detection using distributed event devices, in accordance with one or more embodiments of the present disclosure. As illustrated in FIG. 4, the event device 402 can include a memory 422 and a processor 420 for event detection using distributed event devices in accordance with the present disclosure.

The memory 422 can be any type of storage medium that can be accessed by the processor 420 to perform various examples of the present disclosure. For example, the memory 422 can be a non-transitory computer readable medium having computer readable instructions (e.g., executable instructions/computer program instructions) stored thereon that are executable by the processor 420 for event detection using distributed event devices in accordance with the present disclosure. The computer readable instructions can be executable by the processor 420 to detect an event, wirelessly transmit a notification of the event and/or location information to another event device, determine whether location information is stored in a zonal action list, and/or perform an activation action.

The memory 422 can be volatile or nonvolatile memory. The memory 422 can also be removable (e.g., portable) memory, or non-removable (e.g., internal) memory. For example, the memory 422 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 422 is illustrated as being located within event device 402, embodiments of the present disclosure are not so limited. For example, memory 422 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for event detection using distributed event devices, comprising:

a first event device and a second event device;

wherein the first event device is configured to:

detect an event in an area; and wirelessly transmit a notification of the detected event and a first logical zone associated with the first event device to the second event device; and wherein the second event device is configured to:

determine whether the first logical zone matches a logical zone included in a database in response to receiving the notification; and perform an activation action responsive to determining the first logical zone matches the logical zone included in the database.

2. The system of claim 1, wherein the database includes a zonal action list having a number logical functions.

3. The system of claim 2, wherein the number of logical functions include a number of activation actions corresponding to a number of logical zones.

4. The system of claim 1, wherein a second logical zone is associated with the second event device.

5. The system of claim 4, wherein the first logical zone and the second logical zone at least partially overlap.

6. The system of claim 4, wherein the first logical zone and the second logical zone are separate logical zones.

7. The system of claim 1, wherein the first event device is a fire sensor.

8. The system of claim 1, wherein the second event device is a sounder, a flasher, or a relay output module.

9. An event device for event detection using distributed event devices, comprising:

a memory; and a processor configured to execute executable instructions stored in the memory to:

receive a notification of a detected event and a logical zone associated with a different event device from the different event device;

determine whether the logical zone matches a logical zone included in a database in response to receiving the notification; and perform an activation action responsive to determining the logical zone matches the logical zone included in the database.

10. The event device of claim 9, wherein the database includes a zonal action list having a number of elements.

11. The event device of claim 10, wherein determining the logical zone matches the logical zone included in the database comprises determining the logical zone matches an element of the number of elements in the zonal action list.

12. The event device of claim 9, wherein the database is stored in the memory of the event device.

13. The event device of claim 9, wherein the activation action is one of a number of activation actions included in the database, including at least one of:

turning on a sounder;

pulsing the sounder;

delaying turning on of the sounder;

delaying pulsing of the sounder;

refraining from turning on the sounder;

refraining from pulsing the sounder;

unlocking a door; and double knocking the sounder.

14. A computer implemented method for distributed event devices, comprising:

detecting, by a first event device, an event in an area;

wirelessly transmitting, by the first event device, a notification of the detected event and a first logical zone associated with the first event device to a second event device;

determining, by the second event device, whether the first logical zone is included in a zonal action list stored locally at the second event device in response to receiving the notification; and performing, by the second event device, an activation action responsive to determining the first logical zone is included in the zonal action list.

15. The method of claim 14, wherein the method includes determining, by the second event device, whether the first logical zone is included in the zonal action list by comparing the first logical zone to a number of logical zones included in the zonal action list.

16. The method of claim 15, wherein the method includes determining, by the second event device in response to determining the first logical zone is included in the zonal action list, the activation action from the zonal action list.

17. The method of claim 14, wherein the method includes wirelessly transmitting, by the first event device, the notification and the first logical zone to the second event device via a wireless mesh network.

18. The method of claim 14, wherein the method includes detecting, by a manual call point (MCP), an input to the MCP.

19. The method of claim 18, wherein the method includes transmitting, by the MCP to the second event device, the input.

20. The method of claim 19, wherein the method includes ceasing, by the second event device, the activation action in response to receiving the input from the MCP.

* * * * *